United States Patent
Fischer et al.

(10) Patent No.: US 9,816,577 B2
(45) Date of Patent: *Nov. 14, 2017

(54) DISC BRAKE FOR A COMMERCIAL VEHICLE

(75) Inventors: Rudolf Fischer, Erding (DE);
Christian Raffin, Grasbrunn (DE);
Michael Peschel, Schoengeising (DE);
Florian Orgler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 832 days.

This patent is subject to a terminal disclaimer.

(21) Appl. No.: 12/774,884

(22) Filed: May 6, 2010

(65) Prior Publication Data

US 2010/0282547 A1 Nov. 11, 2010

Related U.S. Application Data

(63) Continuation of application No. PCT/EP2008/009366, filed on Nov. 6, 2008.

(30) Foreign Application Priority Data

Nov. 9, 2007 (DE) .................. 10 2007 053 902

(51) Int. Cl.
| | | |
|---|---|---|
| *F16F 1/38* | (2006.01) | |
| *F16D 55/22* | (2006.01) | |
| *F16D 55/2265* | (2006.01) | |

(52) U.S. Cl.
CPC ...... *F16F 1/3835* (2013.01); *F16D 55/22655* (2013.01)

(58) Field of Classification Search
CPC ... F16D 55/22655; F16D 55/22; F16F 1/3835
(Continued)

(56) References Cited

U.S. PATENT DOCUMENTS 3,616,876 A * 11/1971 Brooks ............... 188/73.45
4,200,173 A * 4/1980 Evans et al. ........ 188/73.45
(Continued)

FOREIGN PATENT DOCUMENTS

| DE | 198 53 439 A1 | 6/2000 |
|---|---|---|
| DE | 102 45 027 A1 | 4/2004 |

(Continued)

OTHER PUBLICATIONS

German Office Action dated Oct. 23, 2008 with English translation (eight (8) pages).

(Continued)

*Primary Examiner* — Thomas J Williams
*Assistant Examiner* — James Hsiao
(74) *Attorney, Agent, or Firm* — Crowell & Moring LLP

(57) ABSTRACT

A disc brake for a commercial vehicle has a caliper that straddles a brake disc. The caliper is mounted on a brake carrier on the vehicle side by way of two connecting bearings in an axially displaceable manner in relation to the brake disc. The connecting bearings each include a guide bar that is securely connected to the brake carrier and guided in a slide bearing of the caliper for the axial displacement thereof. At least one connecting bearing is provided with a radially elastic damping bushing, which at least surrounds the guide bar in regions and has grooves that are laterally delimited by ribs. The disc brake is designed such that the damping bushing has a progressive damping behavior in the radial loading direction.

20 Claims, 7 Drawing Sheets

(58) Field of Classification Search
USPC .............. 188/71.8, 73.42–73.47, 73.1, 73.39
See application file for complete search history.

(56) References Cited

U.S. PATENT DOCUMENTS

| | | | |
|---|---|---|---|
| 4,265,340 A * | 5/1981 | Scott et al. ................. | 188/73.44 |
| 4,331,221 A * | 5/1982 | Evans et al. ................ | 188/73.44 |
| 4,458,790 A * | 7/1984 | Hoffman et al. ............ | 188/71.8 |
| 4,480,724 A * | 11/1984 | Hoffman, Jr. .............. | 188/73.45 |
| 4,678,064 A | 7/1987 | Adachi et al. | |
| 4,807,725 A * | 2/1989 | Weiler et al. ................ | 188/71.8 |
| 5,299,665 A * | 4/1994 | Weiler et al. ............... | 188/73.44 |
| 5,492,415 A * | 2/1996 | Jordens ................. | F16F 1/3835 |
| | | | 384/125 |
| 5,730,258 A | 3/1998 | Evans | |
| 6,135,245 A * | 10/2000 | Kurasako et al. ......... | 188/73.45 |
| 2004/0188191 A1* | 9/2004 | Lintner ...................... | 188/73.45 |
| 2008/0029356 A1* | 2/2008 | Halasy-Wimmer et al. .......................... | 188/73.45 |

FOREIGN PATENT DOCUMENTS

| | | |
|---|---|---|
| DE | 103 41 095 A1 | 4/2005 |
| EP | 0 141 003 A1 | 5/1985 |
| GB | 1 083 726 A | 9/1967 |
| GB | 1 560 676 | 2/1980 |
| GB | 2 156 924 A | 10/1985 |
| GB | 2 345 104 A | 6/2000 |
| JP | 57-157832 A | 9/1982 |
| WO | WO 2005/124179 A1 | 12/2005 |

OTHER PUBLICATIONS

International Search Report dated May 2, 2009 with English translation (six (6) pages).

* cited by examiner

DISC BRAKE FOR A COMMERCIAL VEHICLE

CROSS-REFERENCE TO RELATED APPLICATIONS

This application is a continuation of PCT International Application No. PCT/EP2008/009366, filed Nov. 6, 2008, which claims priority under 35 U.S.C. §119 from German Patent Application No. DE 10 2007 053 902.0, filed Nov. 9, 2007, the entire disclosures of which are herein expressly incorporated by reference.

BACKGROUND AND SUMMARY OF THE INVENTION

The invention relates to a disc brake for a commercial vehicle having a caliper that straddles a brake disc and is fastened in an axially displaceable manner in relation to the brake disc by two connecting bearings to a brake carrier arranged on the vehicle side. The connecting bearings each have a guide bar, which is rigidly connected to the brake carrier and is guided in a slide bearing of the caliper for axial displacement thereof.

In disc brakes of the concerned type, which are known by the term sliding-caliper disc brakes, the caliper is connected to the brake carrier on the vehicle side by connecting bearings. In this case guide bars, which are a component of the connecting bearings and are usually connected to the brake carrier by a threaded fastener, are guided in slide bearings of the caliper such that axial displacement of the caliper with respect to the positionally fixed brake carrier is possible.

One of the slide bearings is in the form of a fixed bearing with a small amount of sliding play, while the other functions as a movable bearing by which, in particular, manufacturing tolerances are compensated.

In addition to the guide bars, the connecting bearings include radially elastic damping bushings that are intended to prevent the caliper, which under operating conditions is movable radially to a certain extent, from striking against the guide bar and producing disturbing clattering noises, above all in vehicles used for conveying passengers. Further, the damping bushings are used for sliding mounting of the guide bar, primarily in the movable bearing, where they are held in the brake caliper, or in a bearing bush fastened therein. A design of this type is known from the category-defining DE 102 45 027 A1.

The damping bushing shown in DE 102 45 027 A1 has on its inner circumferential surface ribs of uniform cross section. The ribs each delimit adjacent grooves. The slideability of the guide pin and the radial damping properties are influenced by these ribs. However, these known damping bushings are not suitable for dealing adequately with the various demands in mobile operation, in particular with regard to shocks that arise.

In particular in the case of a fixed bearing, if the damping bushings, in combination with the bearing bush, jointly form the slide bearing for the guide bar, in which slide bearing both the damping bushing and, in axial prolongation, the bearing bush perform sliding functions, then clashing can occur under correspondingly heavy radial loading of the damping bushing or of the caliper as a whole with respect to the guide bar. The damping bushing, which, moreover, is preferably made of an elastomer, is compressed so far, on account of its damping characteristic curve, that the metal bearing bush contacts the guide bar. This causes the unpleasant clattering noises already mentioned, so that the known disc brake does not offer an optimum solution with regard to operating comfort.

It is the object of the invention to develop a disc brake of the above-mentioned type in such a manner that an improvement in operating comfort and enhanced service life are achieved with low cost and complexity in terms of design and manufacture.

This and other objects are achieved by a disc brake for a commercial vehicle having a caliper that straddles a brake disc and is fastened in an axially displaceable manner in relation to the brake disc by two connecting bearings to a brake carrier arranged on the vehicle side. The connecting bearings each have a guide bar, which is rigidly connected to the brake carrier and is guided in a slide bearing of the caliper for axial displacement thereof. At least one connecting bearing is provided with a radially elastic damping bushing which surrounds in zones the guide bar and has grooves delimited laterally by ribs. The damping bushing is configured to have a progressive damping behavior in a radial loading direction.

A disc brake according to the invention clamps the radial loads, which arise in mobile operation of the vehicle, in an absolutely reliable way, specifically to the extent that the clashing which has been mentioned—in principle the abolishing of the damping property by overcoming of the damping forces—is eliminated.

Especially if the damping bushing is arranged in the region of the fixed bearing while, as mentioned, both the damping bushing and the bearing bush perform sliding functions through contact with the guide bar, the bearing bush is effectively prevented from striking against the guide bar in the event of corresponding shocks while driving. Undesired noise generation resulting therefrom is prevented by the invention. Because the guide bar is thereby naturally subjected to lower mechanical loading, its service life, like that of the bearing bush, is increased.

But the invention offers advantages even if the damping bushing is used in the movable bearing, since the guidance property of the damping bushing is improved by the progressive damping behavior thereof in the radial loading direction. This is because, with increasing radial load, the damping bushing becomes stiffer in its elastic behavior, resulting in the advantage mentioned.

According to an advantageous development of the invention, it is provided that at least some of the ribs are thicker than the other ribs. Alternatively or additionally, some of the ribs may be wider, and their spacing from one another may vary, additionally or optionally.

The cross-sectional contour of the ribs may vary; the flanks thereof are preferably curved concavely and merge into a flat upper face which may be a contact face with the guide bar or the guide bush. It is also possible, however, to adapt the flat upper face to the contour of the guide bush or of the bearing bush. The concave shape of the flanks of the ribs results in a concave configuration of the groove contour, which has an arcuate or otherwise curved configuration.

The disposition of the ribs may be circumferential, axial or diagonal. It is also possible to provide the outer and inner circumferential surface of the damping bushing with ribs, in which case, the upper faces of at least some of the ribs form contact faces too with the guide bar or the bearing bush.

With a corresponding radial loading, the ribs, which are adapted thereto in their progressive behavior, may first be deformed to the extent that they form in that respect a continuous surface with the adjacent grooves. Only with further increasing load do the other ribs, designed for this purpose, come into use, so to speak. It can be understood that a very finely-tuned damping behavior of the damping bushing can be predetermined and therefore realized without difficulty.

A further major advantage of the invention is that the enhanced comfort of the disc brake can be achieved without additional cost, as compared to the damping bushings used hitherto, which is especially noteworthy if account is taken, in particular, of the series production of the component, which is manufactured in large volume.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
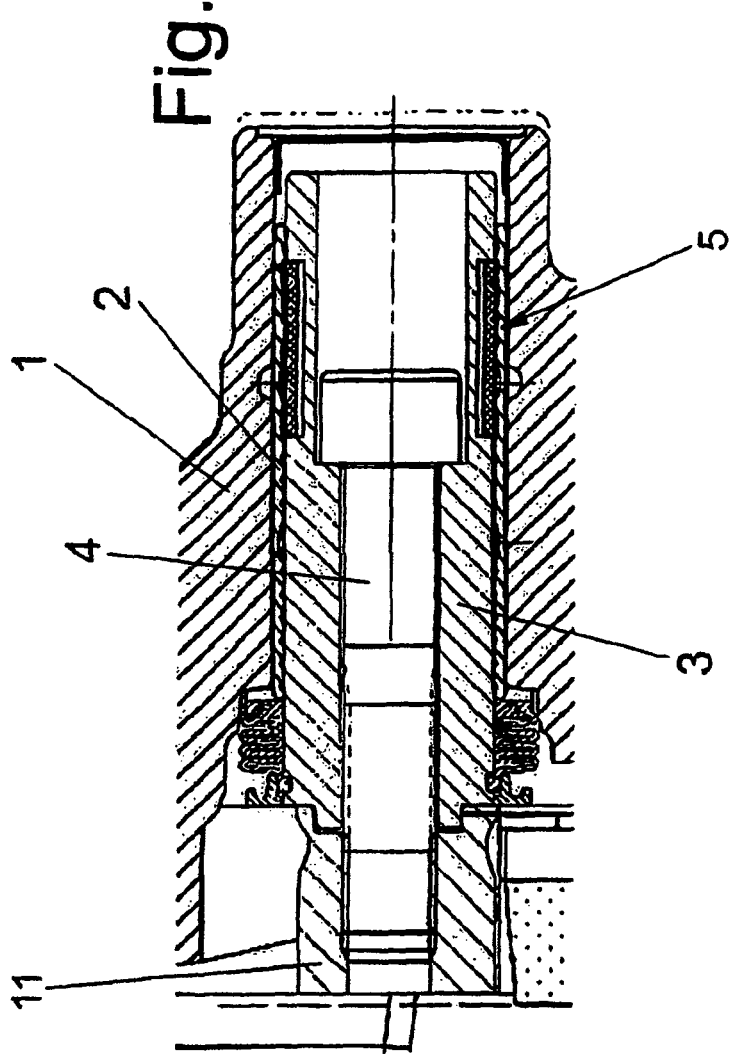
FIG. 1 is a sectional side view of a partial section of a disc brake according to the invention.
Figure 2:
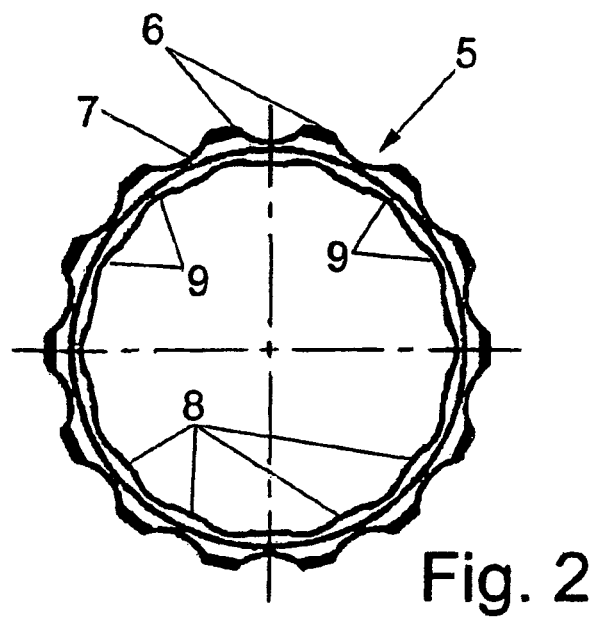
FIG. 2 shows a detail of the disc brake in a top view.
Figure 3:
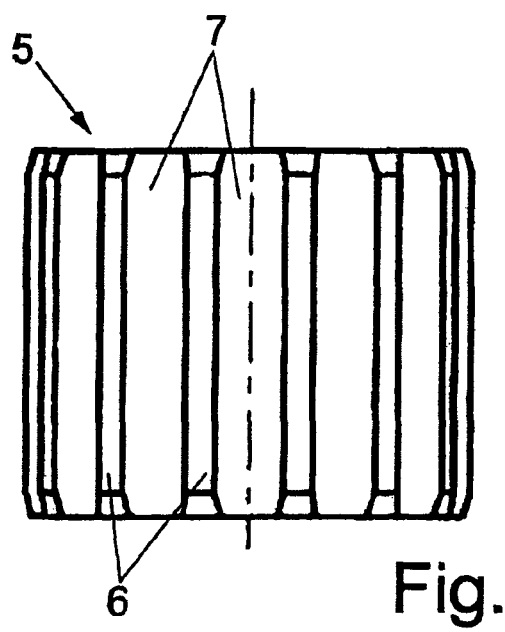
FIG. 3 shows the detail in a side view.
Figure 4:
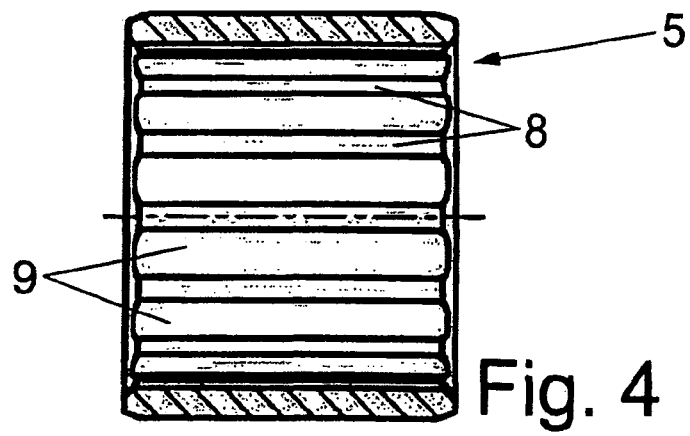
FIG. 4 shows the detail in a sectional side view.

FIG. 1 shows a part of a disc brake, in particular for a commercial vehicle, having a caliper 1 that straddles a brake disc (not shown) and is fastened by way of two connecting bearings to a brake carrier 11 in an axially displaceable manner in relation to the brake disc.

In this case, the connecting bearings each have a guide bar 3. The guide bar 3 is rigidly connected to the brake carrier 11. One of the two guide bars 3 is guided in a slide bearing configured as a movable bearing, and the other in a slide bearing configured as a fixed bearing. This allows for the axial displaceability of the caliper 1 in a sliding caliper type of disc brake. Only the region of the fixed bearing is shown in the exemplary embodiment of FIG. 1.

The guide bar 3 is mounted in a bearing bush 2, which is fastened in the caliper 1 and is made of a material suitable for a slide bearing. The bearing bush 2 slides on the guide bar 3 upon actuation of the disc brake. In addition, the guide bar 3 is screwed to the brake carrier 11 by a threaded fastener such as a screw or bolt 4.

The guide bar 3 of the fixed bearing illustrated in FIG. 1 has on its external circumference a section which is elastically deformable radially in the form of a damping bushing 5. The damping bushing 5 is formed from an elastic material, preferably an elastomer, rubber or the like, and has according to the invention a progressive damping behavior in the radial loading direction.

For this purpose, in the example of the damping bushing 5 shown in FIGS. 2 to 6, a multiplicity of uniformly distributed grooves 7 of equal size are provided on the outer circumferential surface of the damping bushing 5. The grooves 7 extend axially over the full length of the damping bushing and are each delimited laterally by outer ribs 6. The outer ribs 6 form a contact face on the bearing bush 2.

The inner circumferential surface of the damping bushing 5 is also provided with grooves 9 and likewise extend axially over the full length of the damping bushing 5. In the example shown, these grooves 9 are of equal width and are distributed with equal spacing about the inner circumferential surface. The grooves 9 are delimited by inner ribs 8 which bear against the guide bar 3. Both the outer ribs 6 and the inner ribs 8 are disposed parallel to one another.

The (inner) grooves 9 located on the inner circumference are arranged in the overlap region of the outer ribs 6 (generally radially aligned with same) and are of smaller width than the grooves 7 located on the outer circumference. The central axes of the outer ribs 6 lie in a radial plane with the central axes of the inner grooves 9, while the central axes of the outer grooves 7 are disposed in a radial plane with the inner ribs 8.

Figure 5:
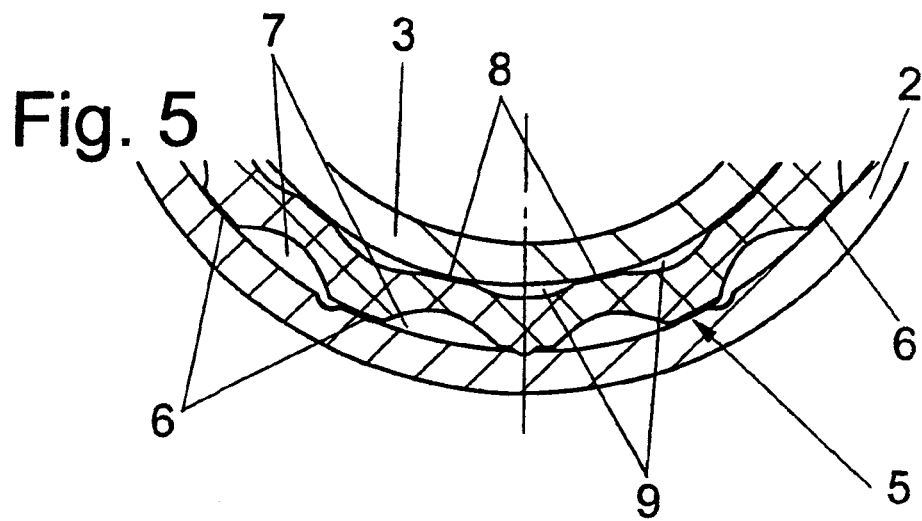
FIGS. 5 and 6 show a partial section of the detail in respective different operating positions.

FIG. 5 shows a position in which the damping bushing 5 is partially loaded radially. It can be seen that the width of the inner grooves 9, which are arcuate in cross section, is smaller than the width of the likewise arcuate outer grooves 7, the radii of curvature of the inner grooves 9 and of the outer grooves 7 being equal whereas their depth is different, resulting in a different width.

Figure 6:
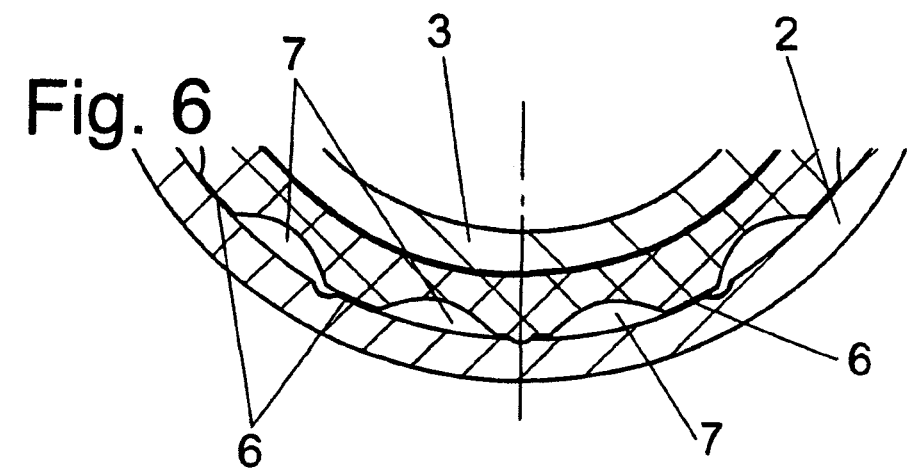

Because the thickness of the damping bushing 5 is therefore greater in the region of the outer ribs 6 and of the inner grooves 9 than the thickness in the region of the outer grooves 7 and the inner ribs 8, this leads to a different progressive behavior, that is, to a different deformation of the damping bushing 5, as represented in FIG. 6.

In this case, because of radial forces acting, the damping bushing 5 is deformed in such a manner that the inner ribs 8 and the adjacent inner grooves 9 form a practically uniform curved surface.

Figure 7:
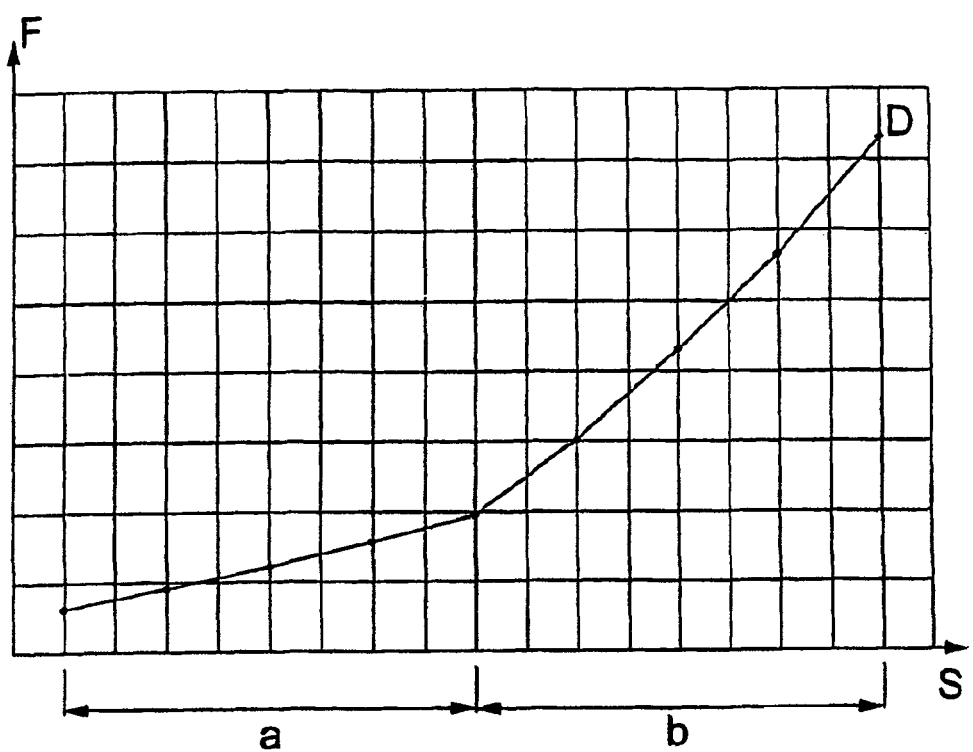
FIG. 7 is a graph for clarification of the invention.

FIG. 7 shows in a graph the progressive damping behavior of the damping bushing 5 in the radial loading direction. In this graph the deformation travel is plotted on the abscissa S and the effective radial force on the ordinate F, while the progression curve is denoted by D. It can be seen that, in the case of partial deformation as shown in FIG. 5, the rise in progression is relatively shallow, within the length a, and that during further radial loading the inner ribs 8 are fully compressed and the progression curve D rises more steeply, the deformation travel, as illustrated in FIG. 6, being indicated by b.

Figure 8:
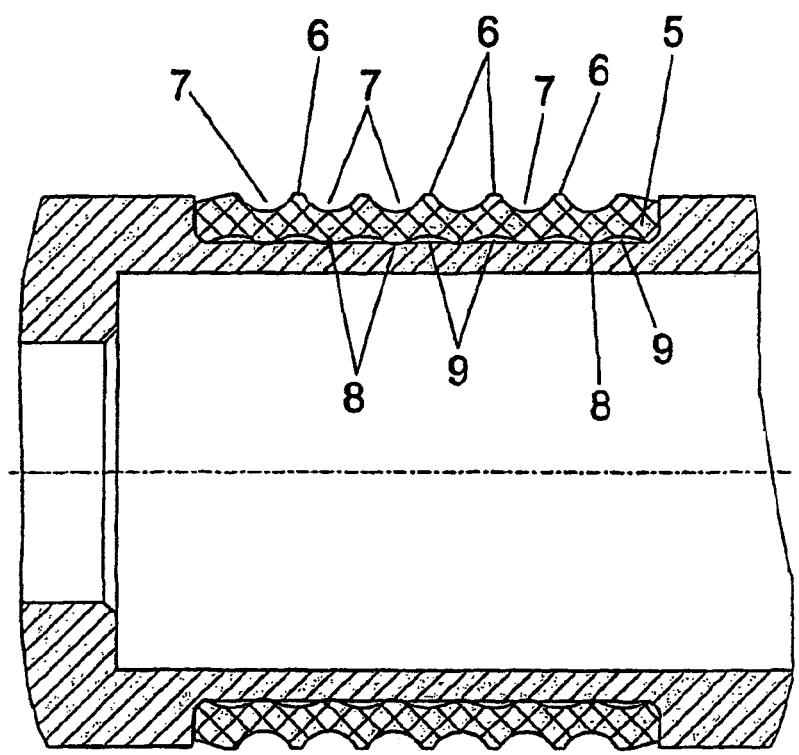
FIGS. 8 to 10 each show a further exemplary embodiment of the invention in sectional side views.

FIG. 8 shows an exemplary embodiment of the damping bushing 5 which corresponds, with regard to the dimensioning of the ribs 6, 8 and of the outer and inner grooves 7, 9, to those in the example of FIGS. 2 to 6, as do the reciprocal relationships thereof. In contrast to that example, the damping bushing 5 according to FIG. 8 is provided with circumferential grooves 7, 9 and ribs 6, 8.

Figure 9:
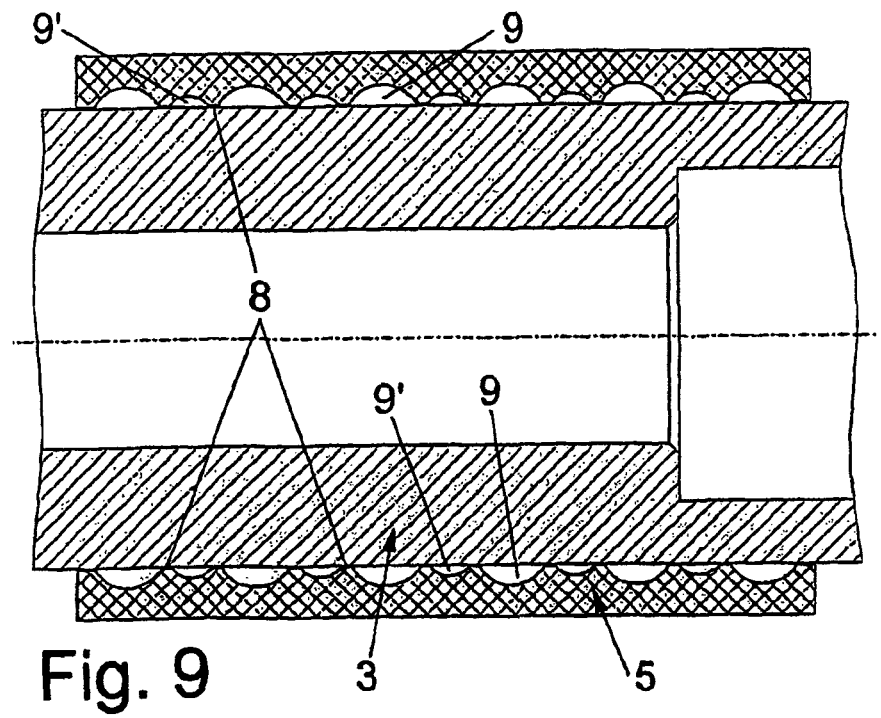

Such circumferential ribs are shown in the variant according to FIG. 9. In this variant, however, the damping bushing 5 has only inner ribs 8 and associated grooves 9, 9', the grooves 9' being smaller in cross section than the grooves 9, which is achieved in that the grooves 9' have a lesser depth than the grooves 9 but an equal radius of curvature. As a result of the lesser depth of the grooves 9', the ribs 8 delimiting them are more closely spaced than those delimiting the larger grooves 9.

Figure 10:
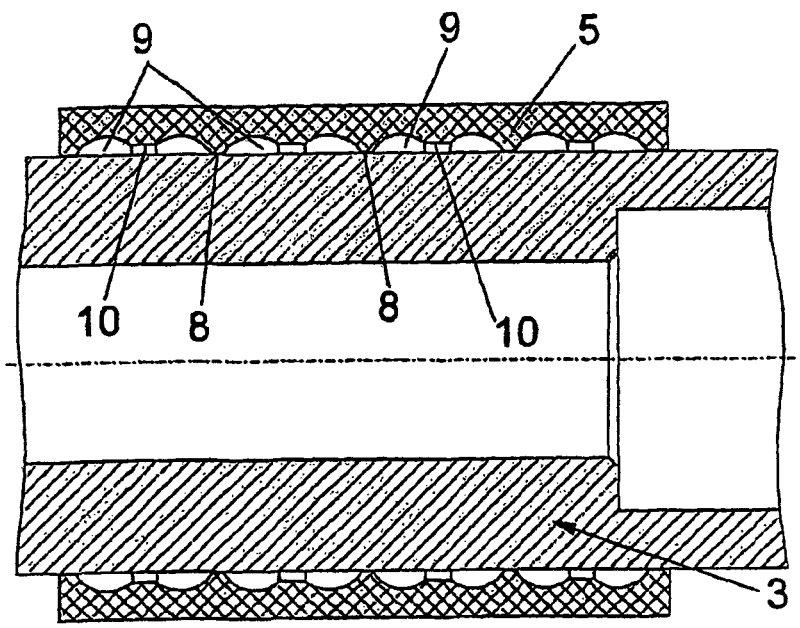

FIG. 10 shows a damping bushing 5 which also has only inner ribs 8, which are in contact with the guide bar 3. The outer circumferential surface of the damping bushing 5 is without profile, like that of the damping bushing 5 according to FIG. 9. In the example according to FIG. 10, only every second inner rib 8 is in contact with the guide bar 3, while an intervening rib 10 bordering two adjacent grooves 9 is disposed at a distance from the cylindrical surface of the guide bar 3.

Figure 11:
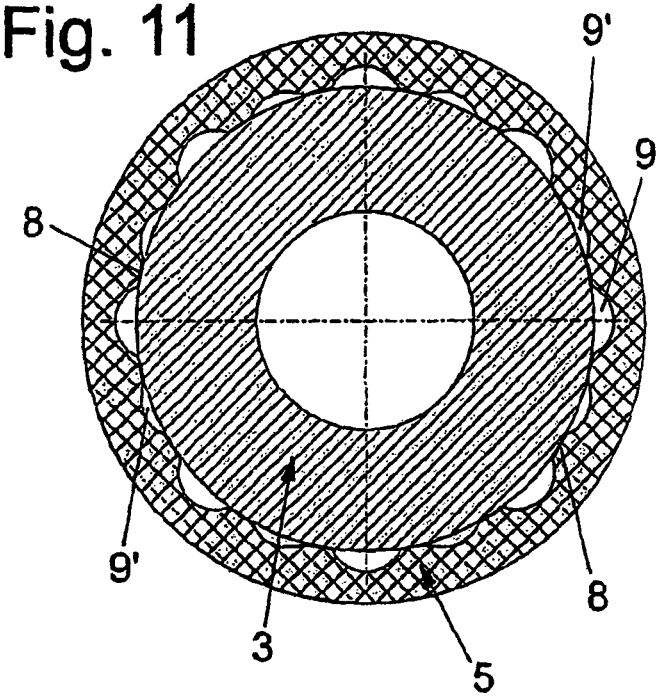
FIGS. 11 and 12 each show a further exemplary embodiment in top views.

The damping bushing 5 shown in FIG. 11 is comparable to that of FIG. 9 with regard to the configuration of the inner ribs 8 and of the grooves 9, 9'. In this case a groove 9' which is smaller in cross section is arranged in each case between two equal grooves 9 with corresponding spacing of the ribs 8, as described with reference to FIG. 9.

Figure 12:
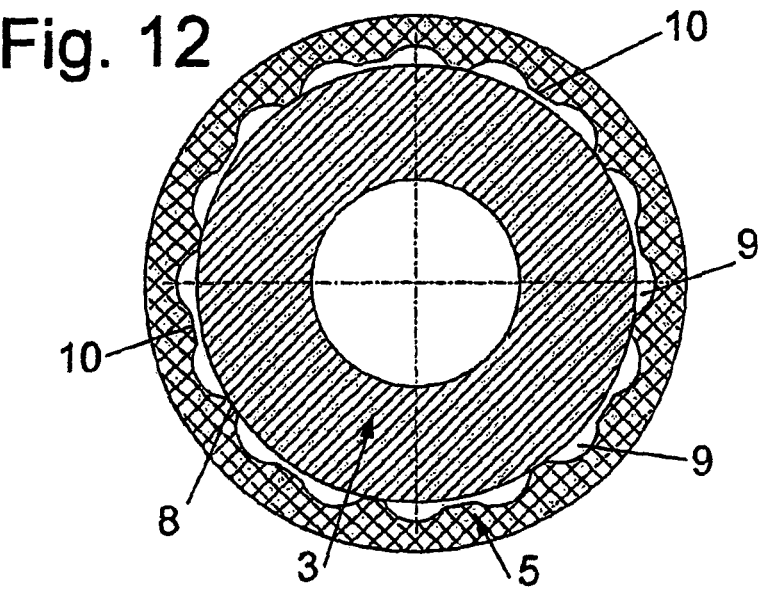

In contrast to FIG. 9, the ribs 8 and grooves 9, 9' to be seen in FIG. 11 are disposed axially, as are those shown in FIG. 12, in which the arrangement and configuration of the ribs 8, 10 corresponds to those of FIG. 10; that is to say that between each two ribs 8 which are in contact with the cylindrical surface of the guide bar 3, a rib 10 is formed at a distance from the guide bar 3 and delimits the respective adjacent grooves 9 on one side.

Self-evidently, contours of the ribs 6, 8, 10 other than those illustrated are possible, for example with oblique flanks.

The arrangement and securing of the damping bushing 5 may also vary according to requirements. For example, the damping bushing 5 may be located in a groove open towards the guide bar 3 or between two bearing bush parts, for which purpose the bearing bush 2 is formed in two parts. In this case, the damping bushing 5 may be positioned additionally in a circumferential groove of the caliper which is open towards the guide bar 3, against which the damping bushing 5 rests in all cases.

TABLE OF REFERENCE NUMERALS

1 Caliper
2 Bearing bush
3 Guide bar
4 Threaded fastener
5 Damping bushing
6 Outer rib
7 Groove
8 Inner rib
9 Groove
9' Groove
10 Rib
11 Brake carrier The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, the disc brake having a caliper that, in use, straddles a brake disc and is fastened to a carrier in an axially displaceable manner relative to the brake disc, the disc brake comprising:
   two connecting bearings by which the caliper is axially displaceably fastenable to the carrier, each connecting bearing having a guide bar that rigidly connects to the carrier and is guided in a respective slide bearing of the caliper allowing axial displacement thereof;
   a radially elastic damping bushing provided for at least one of the two connecting bearings, the radially elastic damping bushing surrounding the guide bar at least in regions and comprises a plurality of radially inner and outer grooves delimited laterally by respective ribs; and
   wherein the damping bushing is operatively configured by use of the grooves and ribs to have a predetermined progressive damping behavior in a radial loading direction of the disc brake,
   the inner grooves and ribs form an essentially uniform curved surface upon deformation, and
   the predetermined progressive damping behavior having a progression curve which over a defined first deformation length rises in a relatively shallow manner and, over a defined second deformation length following the first deformation length, rises more steeply.

2. The disc brake according to claim 1, wherein the progressive damping behavior is variable over partial regions of the damping bushing.

3. The disc brake according to claim 1, wherein one or more of the ribs are at least one of thicker, wider, and differently spaced, with respect to other of the ribs.

4. The disc brake according to claim 1, wherein the ribs are provided on at least one of an inner and outer circumferential surface of the damping bushing.

5. The disc brake according to claim 3, wherein the ribs are provided on at least one of an inner and outer circumferential surface of the damping bushing.

6. The disc brake according to claim 1, wherein the ribs are disposed in one of an axial, circumferential, and diagonal manner on the damping bushing.

7. The disc brake according to claim 4, wherein the ribs are disposed in one of an axial, circumferential, and diagonal manner on the damping bushing.

8. The disc brake according to claim 1, wherein the plurality of grooves extend axially over substantially an entire length of the damping bushing.

9. The disc brake according to claim 1, wherein the ribs form contact faces for at least one of a bearing bush and the guide bar.

10. The disc brake according to claim 1, wherein the ribs are on outer and inner circumferential surfaces of the damping bushing, said outer ribs and inner ribs being disposed respectively at equal angular distances from one another.

11. The disc brake according to claim 10, wherein widths of the outer ribs are equal and widths of the inner ribs are equal.

12. The disc brake according to claim 1, wherein a central longitudinal axis of each rib on an outer circumferential surface of the damping bushing and a central longitudinal axis of an associated groove on an inner circumferential surface of the damping bushing are arranged in a common radial plane.

13. The disc brake according to claim 12, wherein a central longitudinal axis of each groove on an outer circumferential surface of the damping bushing and a central longitudinal axis of an associated rib on an inner circumferential surface of the damping bushing are arranged in a common radial plane.

14. The disc brake according to claim 1, wherein the plurality of grooves comprise inner grooves formed on an inner circumferential surface of the damping bushing and outer grooves formed on an outer circumferential surface of the damping bushing, widths of the inner grooves being smaller than widths of the outer grooves.

15. The disc brake according to claim 1, wherein the ribs are disposed parallel to one another.

16. The disc brake according to claim 1, wherein the ribs have concavely curved flanks in cross-section.

17. The disc brake according to claim 16, wherein the ribs are on outer and inner circumferential surfaces of the damping bushing, a radius of curvature of the curved flanks of the inner ribs being equal to a radius of curvature of the curved flanks of the outer ribs.

18. The disc brake according to claim 13, wherein a thickness of the damping bushing in a region of the outer ribs and associated inner grooves differ from a thickness in a region of the outer grooves and associated inner ribs.

19. The disc brake according to claim 1, wherein at least one groove having a smaller cross-section is arranged between two grooves having an equally sized larger cross-section.

20. The disc brake according to claim 1, wherein at least one rib at a distance from the guide bar or a bearing bushing is provided between two ribs in contact with the guide bar or the bearing bushing.

* * * * *